US006643238B2

(12) United States Patent
Nakajima

(10) Patent No.: US 6,643,238 B2
(45) Date of Patent: Nov. 4, 2003

(54) METHOD OF DISCRIMINATING DISK TYPE AND REPRODUCING APPARATUS THEREOF

(75) Inventor: Eiji Nakajima, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 238 days.

(21) Appl. No.: 09/933,118

(22) Filed: Aug. 21, 2001

(65) Prior Publication Data

US 2002/0044509 A1 Apr. 18, 2002

(30) Foreign Application Priority Data

Aug. 24, 2000 (JP) ........................................ 2000-253585

(51) Int. Cl.$^7$ ................................................. G11B 7/00
(52) U.S. Cl. ................... 369/53.22; 369/53.1; 369/47.1
(58) Field of Search ...................... 369/47.1, 47.39, 369/47.41, 47.46, 53.1, 53.11, 53.2, 53.22, 53.37, 53.41, 53.45, 59.1, 44.13

(56) References Cited

U.S. PATENT DOCUMENTS

| 5,587,981 A | 12/1996 | Kamatani | 369/58 |
| 5,745,461 A | * 4/1998 | Kawasaki | 369/53.23 |
| 5,764,610 A | 6/1998 | Yoshida et al. | 369/58 |
| 5,959,280 A | 9/1999 | Kamatani | 235/454 |
| 5,963,518 A | * 10/1999 | Kobayashi et al. | 369/47.27 |

FOREIGN PATENT DOCUMENTS

| EP | 0 834 876 A2 | 4/1998 |
| EP | 0 838 818 A2 | 4/1998 |
| EP | 0 860 822 A1 | 8/1998 |
| EP | 0 862 164 A2 | 9/1998 |
| EP | 0 874 356 A2 | 10/1998 |

* cited by examiner

*Primary Examiner*—Muhammad Edun
(74) *Attorney, Agent, or Firm*—Morgan, Lewis & Bockius LLP

(57) ABSTRACT

A disk type discrimination method for optical disks is designed to function also with a DVD-RW of version 1.0, in which, with avoiding access to an unreadable zone, the compatibility with disks in the conventional versions including a DVD-R can be maintained, and a reproducing apparatus thereof. When a medium loaded in a reproducing apparatus is judged as a DVD, by detecting the presence or absence of wobble, searching a control data zone if the wobble is not present, if present, searching an RW physical format information zone to confirm type information, if the type information is the DVD-RW, searching again the data area to perform reproduction, if the DVD-R, searching a control data zone to confirm the DVD-R, and then reproducing, with avoiding access to an unreadable zone, the compatibility with disks in the conventional versions including the DVD-R is maintained.

6 Claims, 4 Drawing Sheets

METHOD OF DISCRIMINATING DISK TYPE AND REPRODUCING APPARATUS THEREOF

BACKGROUND OF THE INVENTION

1. Field of the Invention

The present invention relates to a method of discriminating the type of an optical disk and a reproducing apparatus thereof particularly suitable for use in a DVD-RW reproducing apparatus.

2. Description of Related Art

Owing to the diversification of a CD-ROM format and the advent of a DVD (digital versatile disk), various types of optical disks appear and they tend to increase in the future. Currently, in the category of the CD-ROM format, there are a CD-ROM for read only and a CD-R on which writing is possible. In the category of the DVD, there are a DVD-ROM (also including a DVD-Video) for read only, a DVD-R and a DVD-RW in which the allowable number of times of rewriting is one and finite respectively, and a DVD-RAM capable of reading/writing any times.

The above-mentioned DVD-R is not different from the DVD-ROM (also including the DVD-Video) with respect to the point that wobble and land prepit are adopted as the track format and data is recorded on the land portion of the disk. Data such as address information and so on are recorded on this land portion, and, by utilizing this, a drive can know accurate positional information on the data. Thus, when data is additionally written, recording can be performed with high accuracy.

A standard developed using this DVD-R as the base so that data can be written and erased (additional writing) is the DVD-RW. Currently, in the place of the DVD forum, an arranging work for the DVD-RW of version 1.0 standard is in progress. The DVD-RW is sequential writing and the physical specifications are substantially the same as those of the DVD-R. For the future, it is provided as a DVD-R/RW drive and both media of the DVD-R and the DVD-RW can be read/written by a single drive.

Incidentally, in a conventional DVD-RW reproducing apparatus, upon reproducing, by searching a data area formatted at a slightly outer peripheral position of a physical sector number "30000h" (sector number) allocated as a lead-in area, it is started, and, when the loaded disk is judged as the DVD, it searches "2F200h" to obtain control data. These format information will be described later with reference to FIG. 3.

However, in the above-mentioned DVD-RW of version 1.0, since data allocated to the control data zone of "2F200H" to "2FE00h" is recorded as data which cannot be read/written by emboss pits, search to this area is impossible.

For example, in case of recording data actually readable to the control data zone as the DVD-ROM (also including the DVD-Video) or the DVD-R, according to the DVD-RW following the DVD-RW of version 1.0, land prepit (guide signal) is in the land portion, and, due to the presence of this portion, data in the control data zone can not be read. Therefore, it becomes hard to reproduce each medium of the DVD-RW and the DVD-R or the DVD-ROM (also including the DVD-Video) by a single reproducing apparatus.

OBJECT AND SUMMARY OF THE INVENTION

The present invention has been made in view of the above circumstances, and an object of the present invention is to provide a method of discriminating a type of optical disks which can also discriminate a DVD-RW of version 1.0, in which, when a medium loaded in a reproducing apparatus is judged as a DVD, by detecting the presence or absence of wobble, searching a control data area if the wobble is not present, if present, searching an RW physical format information zone to confirm type information, if the type information is the DVD-RW, searching again the data area to perform reproduction, judging as a DVD-R if all are "0", searching a control data zone to confirm the DVD-R, and then reproducing, with avoiding access to an unreadable zone, the compatibility with disks in conventional versions including the DVD-R or a DVD-ROM (also including a DVD-Video) can be maintained, and a reproducing apparatus thereof.

In order to solve the above problem, according to the first aspect of the present invention, there is provided a method of discriminating a type of disk for discriminating disk type between a first disk in which a first area in a lead-in area has an unreadable area and disk type information is recorded in a readable second area different from the first area, and a second disk in which disk type information is recorded in a readable first area in a lead-in area, the method comprising detecting the presence or absence of wobble at a predetermined position on a disk; and, when the wobble is not detected, searching the first area to read the disk type information, and, when the wobble is detected, searching the second area to read the disk type information, thereby discriminating the disk type.

According to the second aspect of the present invention, in the above method, the first area is a control data zone, the second area is an RW physical format information zone, the first disk is a DVD-RW, and the second disk is a DVD-R, and the method comprises, when the wobble is not detected, searching the control data zone to read disk type information, and judging whether or not the disk type is a DVD-ROM (also including DVD-Video); and, when the wobble is detected, searching the RW physical format information zone to read the record information, when the record information is 0, searching the control data zone to read the disk type information, and judging whether or not the disk type information is the DVD-R.

According to the third aspect of the present invention, in the method according to the first aspect of the present invention, the first area is a control data zone, the second area is an RW physical format information zone, the first disk is a DVD-RW, and the second disk is a DVD-ROM (also including a DVD-Video), and the method comprises, when the wobble is not detected, searching the control data zone, and judging whether or not the disk type is a DVD-ROM (also including a DVD-Video); and, when the wobble is detected, searching the RW physical format information zone to read the disk type information, and judging whether or not the disk type is the DVD-RW.

According to the fourth aspect of the present invention, there is provided a reproducing apparatus which can reproduce a first disk in which a first area in a lead-in area has an unreadable area and disk type information is recorded in a readable second area different from the first area, and a second disk in which disk type information is recorded in a readable first area in a lead-in area, the apparatus comprising a wobble detection section for detecting the presence or absence of wobble; a disk type information reading section for, when the wobble is not detected, searching the first area to read the disk type information, and, when the wobble is detected, searching the second area to read the disk type information; and a reproduction control section for performing a reproduction operation in accordance with the disk type information.

According to the fifth aspect of the present invention, in the apparatus according to the fourth aspect of the present invention, the first area is a control data zone, the second area is an RW physical format information zone, the first disk is a DVD-RW, and the second disk is a DVD-R, and the reproduction control section, when the wobble is not detected, searches the control data zone to read the disk type information, and, after confirming the disk type to be DVD-ROM (also including a DVD-Video), performs reproduction, and, when the wobble is detected, searches the RW physical format information zone to read the record information, when the record information is 0, searches the control data zone to read the disk type information, and, after confirming that the disk type information is the DVD-R, performs reproduction.

According to the sixth aspect of the present invention, in the apparatus according to the fourth aspect of the present invention, the first area is a control data zone, the second area is an RW physical format information zone, the first disk is a DVD-RW, and the second disk is a DVD-ROM (also including a DVD-Video), and the reproduction control section, when the wobble is not detected, searches the control data zone to read the disk type information, and, after confirming that the disk type is the DVD-ROM (also including the DVD-Video), performs reproduction, and, when the wobble is detected, searches the RW physical format information zone to read the disk type information, and, after confirming that the disk type information is the DVD-RW, performs reproduction.

According to the above construction, the DVD-ROM (also including the DVD-Video) or the DVD-R/RW drive in which the DVD-ROM (also including the DVD-Video) or both media of the DVD-R and the DVD-RW can be read/written by a single drive can be provided, and thereby the compatibility with disks in the conventional versions including the DVD-ROM (also including the DVD-Video) or the DVD-R can be maintained.

DETAILED DESCRIPTION OF THE PREFERRED EMBODIMENTS

Figure 1:
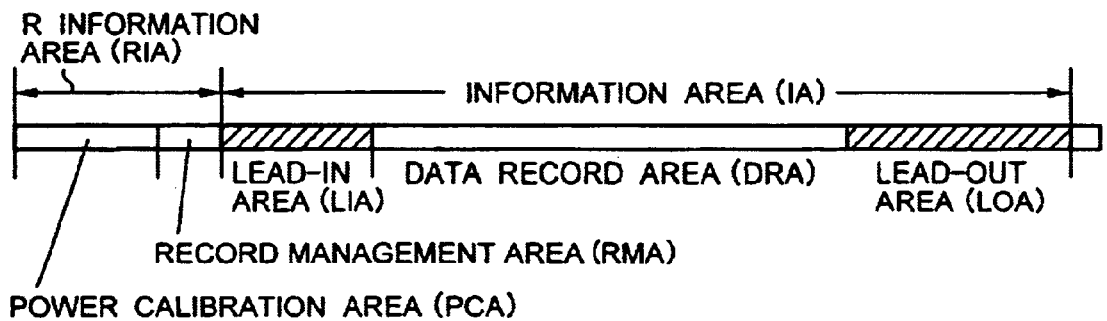
FIG. 1 is a view showing the disk structure of a DVD-RW for use in the present invention.

FIG. 1 is a view schematically showing the data structure of a DVD-R or a DVD-RW.

In FIG. 1, on this disk, a groove and a land are spirally formed around a clamping area, and, on the land, land prepit for regulating physical address is formed. On the basis of address information of the land prepit, a pickup of an information recording/reproducing apparatus is positioning-controlled and thereby information recording (data writing) and information reproducing of the groove are performed. To the groove in which the above data writing or data reading is performed, an R-information area (RIA) and an information area (IA) are allocated from the radial inside part toward the radial outside part.

The R-information area RIA is constituted by a power calibration area (PCA) and a recording management area (RMA), and the information area IA is constituted by a lead-in area (LIA), a data record table area (DRA), and a lead-out area (LOA).

Here, in the data record table area DRA, various contents data such as audio data, video data, and so on, and file management information for managing the contents data as files. In the recording management area RMA, the lead-in area LIA, and the lead-out area LOA, recording management data indicating the recording state of the main data recorded in the data record table area DRA is recorded. The power calibration area PCA is provided for controlling the light amount or the like of the pickup in order that, when the information recording/reproducing apparatus performs data writing, it performs trial writing or the like and data writing in a proper operation state can be performed. In the recording management area RMA, recording management data for managing the recording states of lead-in, lead-out, and DRA is recorded.

In the lead-in area LIA, recording management data indicating physical information of the disk is recorded. The lead-out area LOA is provided at an terminal end position of the main data recorded in the data record table area DRA. In the lead-out area LOA, data of (00)h is recorded. The recording start position of the lead-out area LOA changes in accordance with the data amount of the main data.

These area addresses of the respective areas PCA, RIA, LIA, ERA, and LOA, and the recording address of data are set up in accordance with the ECC block address physically determined on the basis of the above-mentioned land prepit.

Figure 2:
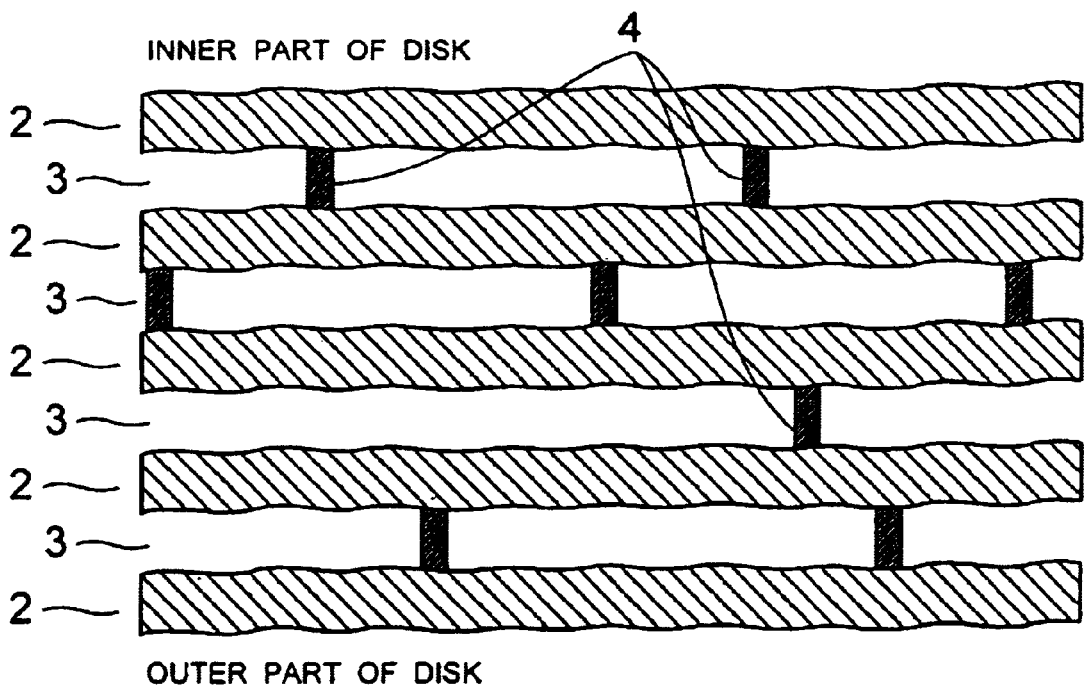
FIG. 2 is a view showing the arrangement relation between grooves and lands in the DVD-RW shown in FIG. 1.

FIG. 2 is a view showing the arrangement relation between the groove and land in a DVD-RW(1). In the DVD-RW, a track is recorded in a groove 2, and a prepit 4 (guide signal) is disposed on the right and left, which, seeing the address written in a land 3 (guide track) generates a physical sector number of the groove 2, and records information signals.

Figure 3:
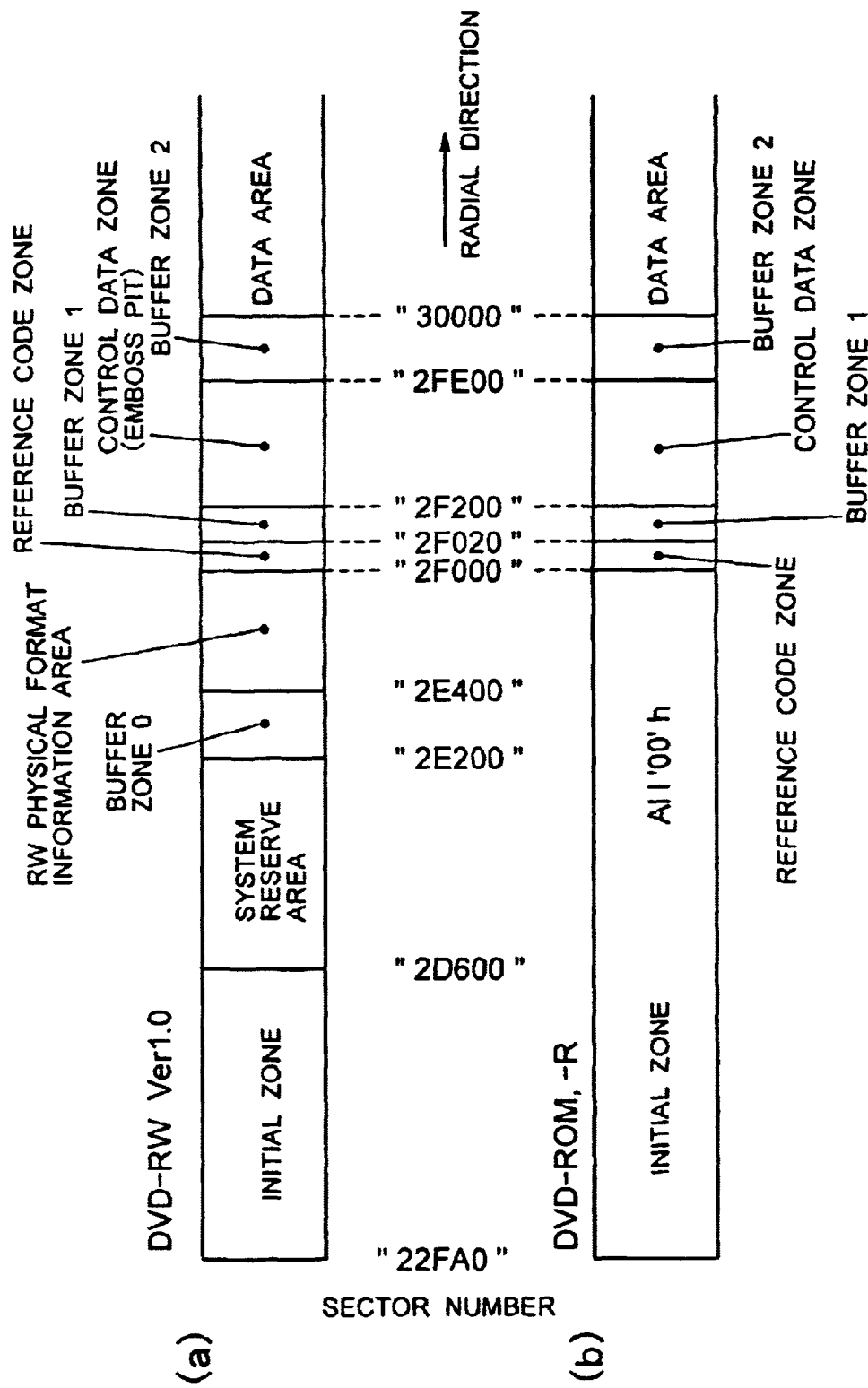
FIG. 3 is a view showing an embodiment of the present invention as a layout of a lead-in area.

FIG. 3 is a view showing the structure of the lead-in area, and each of the DVD-RW of version 1.0 and a DVD-ROM (also including a DVD-Video) and a DVD-R is shown by comparing as a portion (a) and a portion (b).

In FIG. 3, in both of the portion (a) and the portion (b), at sector number "22FA0h" as the start position of lead-in, an initial zone is allocated, and, in this initial zone, (00)h which means blank is set.

In the portion (a), successively from this initial zone, a system zone is allocated from sector number "2D600", and a buffer zone of the blank (00)h is provided from sector number "2E200". Subsequently, at sector number "2E400h", an RW physical format information zone is allocated, where various information and so on concerning the type of DVD standard applied (type of DVD standard (a DVD-ROM (also including a DVD-Video), a DVD-RAM, a DVD-RW or the like)) and part version, disk size and the maximum reading rate, disk structure (one-layer ROM disk, one-layer RAM disk, two-layer ROM/RAM disk, or the like), recording density, data area allocation, linear velocity conditions for exposure light amount designation upon recording in a burst cutting area, writing power, peak power, bias power, and the manufacture of the medium, are recorded.

Then, on and after sector number "2F000", both of the portion (a) and the portion (b) are formatted in the same manner, first, a reference code zone is provided, and, in this reference code zone, an emboss reference code is recorded. As the emboss reference code, a code word in a predetermined conversion table is repeated. In order that this predetermined code word is correctly read out, in other words, in order to be read out within the range of a predetermined error ratio, the apparatus is set. Subsequently from this reference code zone, also, a buffer zone of blank (00)h, and a control zone are provided.

Figure 4:
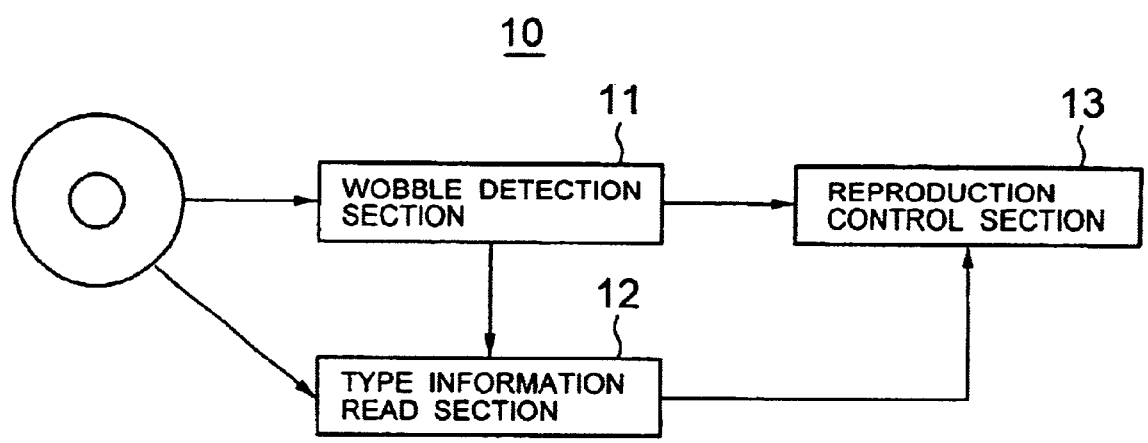
FIG. 4 is block diagram showing the internal construction of a disk reproducing apparatus of the present invention with functional development.

FIG. 4 is a block diagram showing the internal construction of a disk reproducing apparatus of the present invention with functional development, where, of each functional block constituting the DVD-RW reproducing apparatus, only blocks concerning format control are extracted and shown.

More specifically, a system controller (not shown) as the control center of the disk reproducing apparatus corresponds to that block described above. The system controller is made up from a CPU for controlling the reproducing apparatus on the basis of a program, a ROM for storing the program, and a RAM in which a working area is allocated and which is used by the CPU.

The DVD-RW reproducing apparatus 10 comprises a wobble detection section 11, a type information reading section 12, and a reproduction control section 13. The wobble detection section has a function of searching a data area and starting up, and, when it is judged as the DVD, detecting the presence or absence of wobble. The type information reading section has a function of, if wobble is not present, searching the control data area allocated to the lead-in area, and, if present, searching the RW physical format information area allocated to the lead-in area to obtain type information. The reproduction control section has a function of, if the type information is the DVD-RW, searching again the data area and performing reproduction, and, if all are "0", judging as the DVD-R, searching the control data area allocated to the lead-in area, confirming to be the DVD-R, and reproducing. In short, when searching the physical format information area, as shown in FIG. 3, if it is the DVD-RW, type information or the like is recorded, and if it is the DVD-ROM (also including the DVD-Video) or the DVD-R, all "0" of the initial zone are recorded.

Figure 5:
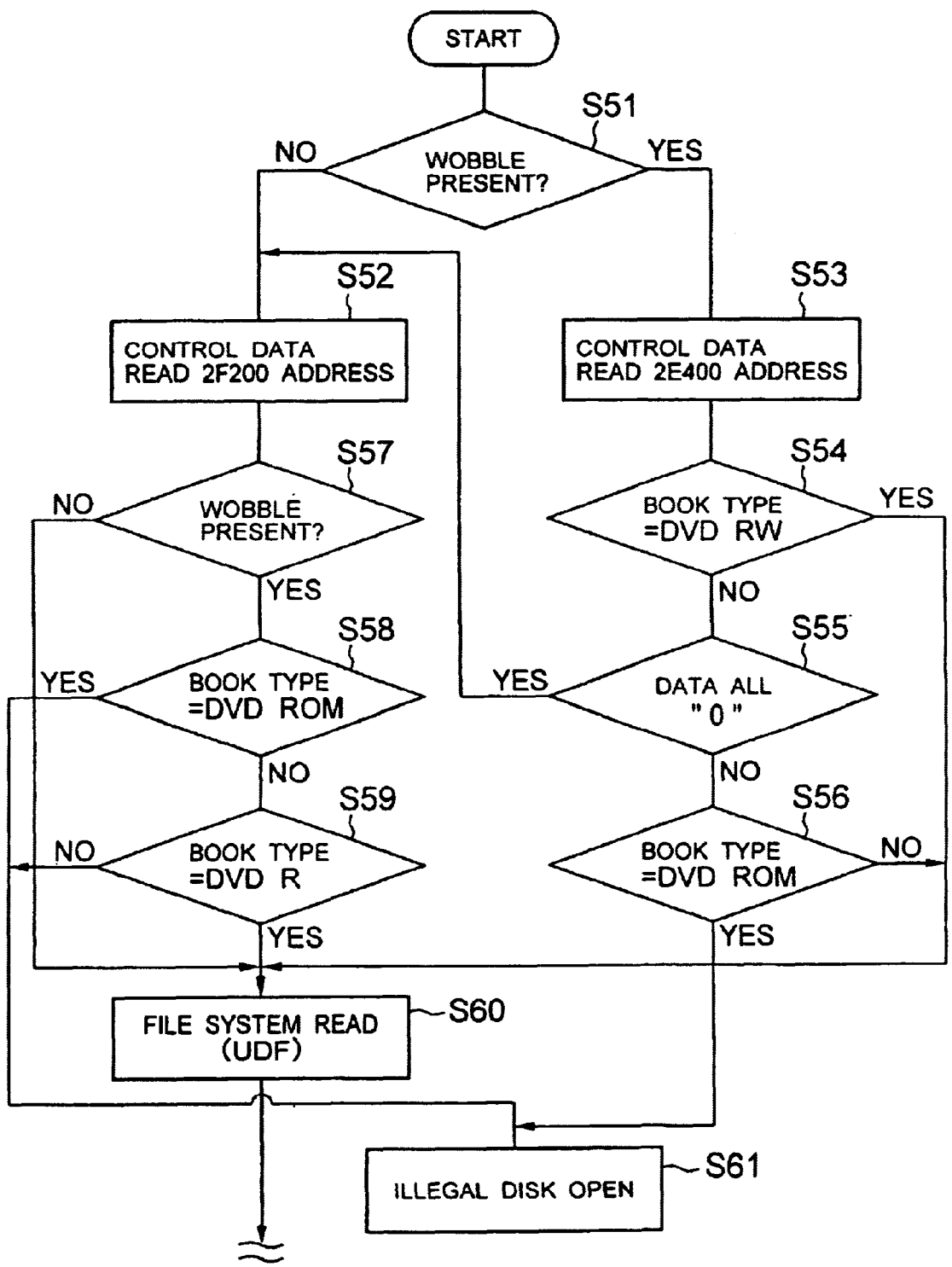
FIG. 5 is a flowchart cited for explaining a disk type discrimination method of the present invention.

FIG. 5 is a flowchart cited for explaining a disk type discrimination method of the present invention. Hereinafter, the operation of embodiment of the present invention will be described in detail with reference to the flowchart shown in FIG. 5.

First, the DVD-RW reproducing apparatus 10 searches the slightly outer periphery of sector number "30000h" and starts up, and, after it is judged as the DVD, performs detection of wobble (step S51). In the judgment of the DVD, for example, since a CD and the DVD are different in track pitch, when the number of pitches of a tracking error signal obtained when crossing a predetermined interval track is more than a predetermined value, it is judged as the DVD, and when less, it is judged as the CD.

As a result of the check of the presence or absence of wobble, when no wobble is present (step S51: NO), assuming that it is the DVD-ROM (also including the DVD-Video), the DVD-RW reproducing apparatus searches the control data zone on and after sector number "2F200h", reads book type recorded in the physical format information area therein (step S52). Then, after confirming that the book type is the DVD-ROM (also including the DVD-Video), the apparatus searches the data area on and after "30000h", reads a file system (step S60), and, after this, enters reproduction processing.

On the other hand, when wobble is present (step S51: YES), assuming that it is the DVD-RW or the DVD-R, the DVD-RW apparatus searches the RW physical format information zone on and after "2E400h", and, to read a book type recorded in the physical format information area therein, reads the first one byte of the physical format information area (step S53). Here, the book type is allocated to the head 4 bits in the first one byte of the physical format information area.

Furthermore, if the book type is the DVD-RW (step S54: YES), it judges as the DVD-RW, searches the data area, reads the file system (step S60), and enters reproduction processing. If the book type is not the DVD-RW (step S54: NO), it judges whether or not all the read physical format information area are "0". If all are "0" (step S55: YES), assuming that it is the DVD-R as described above, the DVD-RW reproducing apparatus searches the control data zone on and after "2F200h", and reads the book type stored in the physical format information area therein (step S52), after confirming that the book type is the DVD-R (step S59: YES), the apparatus searches the data area, reads the file system (step S60), and enters reproduction processing.

It should be noted that, in spite of the presence of wobble, when it is judged that the book type is the DVD-ROM (also including the DVD-Video) (step S56: YES, step S58: YES), the disk is discriminated a disk illegally copied and the tray is opened (step S61).

As described above, according to the present invention, in the DVD-RW of version 1.0, even when the contents of the control data zone are in a state that reading by emboss pit is impossible, by detecting wobble and reading the book type, with avoiding access to the unreadable zone, discrimination between the DVD-RW and the DVD-R, or the DVD-ROM (also including the DVD-Video) is possible, and the respective media of the DVD-RW and the DVD-R and the DVD-ROM (also including the DVD-Video) can be read/written by a single DVD reproducing apparatus.

When the disk was started up, searching was performed for the slightly outer periphery of "30000h". In short, it should be noted that searching can be conducted at any place as long as the search of the control data zone can be avoided.

Besides, in step S55 of FIG. 5, although it is judged whether or not all the physical format information area are "0", it is not limited to this. It may be judged whether or not a predetermined byte number in an arbitrary area in the physical format information area is "0".

As described above, according to the present invention, by detecting the presence or absence of wobble when the medium loaded on the reproducing apparatus is judged as the DVD, if no wobble is present, searching the control data zone, if present, searching the DVD-RW physical format information zone to confirm type information, if the type information is the DVD-RW, searching again the data area to perform reproduction, if all are "0", judging as the DVD-R, after searching the control data area to confirm to be the DVD-R, starting reproduction, with avoiding access to the unreadable zone, a disk reproduction apparatus, here, a DVD reproduction apparatus, capable of operating with the DVD-RW of version 1.0 in which the compatibility with disks in conventional versions including the DVD-R or the DVD-ROM (also including the DVD-Video) is maintained can be provided.

This application is based on Japanese Patent Application No. 2000-253585 which is hereby incorporated by reference.

What is claimed is:

1. A method of discriminating a disk type for discriminating the disk type between a first disk in which a first area in a lead-in area has an unreadable area and disk type information is recorded in a readable second area different from the first area, and a second disk in which disk type information is recorded in a readable first area in a lead-in area, said method comprising the steps of:

detecting the presence or absence of wobble at a predetermined position on a disk; and when said wobble is not detected, searching said first area to read said disk type information, and, when said wobble is detected, searching said second area to read said disk type information, thereby discriminating the disk type.

2. The method according to claim 1, wherein said first area is a control data zone, said second area is an RW physical format information zone, said first disk is a DVD-RW, and said second disk is a DVD-R, said method comprising the steps of:

when said wobble is not detected, searching said control data zone to read disk type information, and judging whether or not the disk type is a DVD-ROM; and when said wobble is detected, searching said RW physical format information zone to read the record information, when the record information is 0, searching said control data zone to read said disk type information, and judging whether or not the disk type information is the DVD-R.

3. The method according to claim 1, wherein said first area is a control data zone, said second area is an RW physical format information zone, said first disk is a DVD-RW, and said second disk is a DVD-ROM (also including a DVD-Video), said method comprising the steps of:

when said wobble is not detected, searching said control data zone, and judging whether or not the disk type is the DVD-ROM (also including the DVD-Video); and when said wobble is detected, searching said RW physical format information zone to read the disk type information, and judging whether or not the disk type is the DVD-RW.

4. A disk reproducing apparatus capable of reproducing a first disk in which a first area in a lead-in area has an unreadable area and disk type information is recorded in a readable second area different from said first area, and a second disk in which disk type information is recorded in a readable first area in a lead-in area, said apparatus comprising:

a wobble detection section for detecting the presence or absence of wobble;

a disk type information read section for, when said wobble is not detected, searching said first area to read said disk type information, and, when said wobble is detected, searching said second area to read said disk type information; and a reproduction control section for performing a reproduction operation in accordance with said disk type information.

5. The apparatus according to claim 4, wherein said first area is a control data zone, said second area is an RW physical format information zone, said first disk is a DVD-RW, and said second disk is a DVD-R, and said reproduction control section, when said wobble is not detected, searches said control data zone to read the disk type information, and, after confirming the disk type to be DVD-ROM (also including a DVD-Video), performs reproduction, and, when said wobble is detected, searches said RW physical format information zone to read the record information, when the record information is 0, searches said control data zone to read said disk type information, and, after confirming that the disk type information is the DVD-R, performs reproduction.

6. The apparatus according to claim 4, wherein said first area is a control data zone, said second area is an RW physical format information zone, said first disk is a DVD-RW, and said second disk is a DVD-ROM (also including a DVD-Video), and said reproduction control section, when said wobble is not detected, searches said control data zone to read the disk type information, and, after confirming that the disk type is the DVD-ROM (also including the DVD-Video), performs reproduction, and, when said wobble is detected, searches said RW physical format information zone to read said disk type information, and, after confirming that the disk type information is the DVD-RW, performs reproduction.

* * * * *